UNITED STATES PATENT OFFICE.

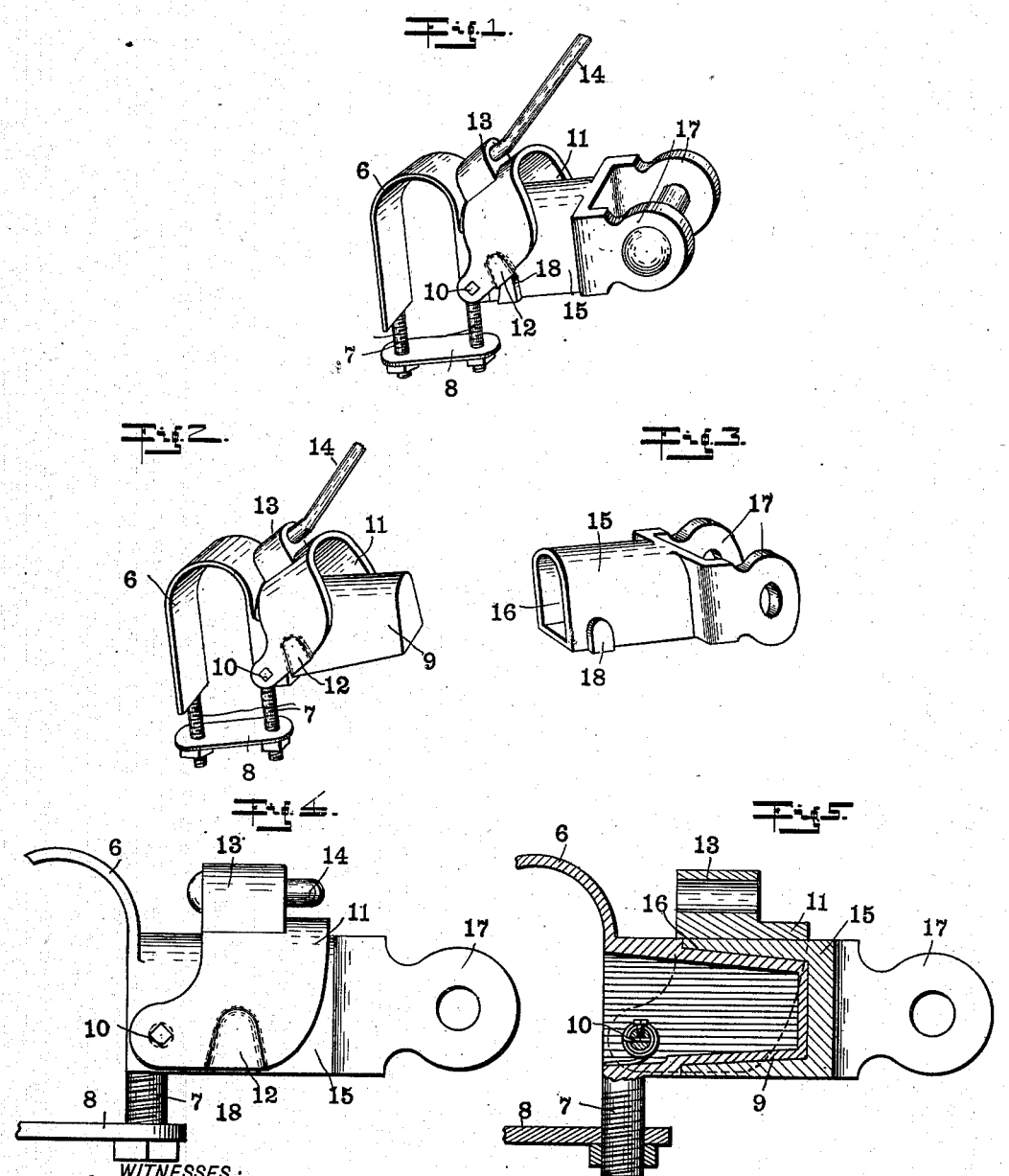

JOSEPH HEARNE, OF INDIANAPOLIS, INDIANA.

VEHICLE SHAFT OR POLE COUPLING.

SPECIFICATION forming part of Letters Patent No. 714,371, dated November 25, 1902.

Application filed May 24, 1902. Serial No. 108,766. (No model.)

*To all whom it may concern:*

Be it known that I, JOSEPH HEARNE, a citizen of the United States, residing at Indianapolis, in the county of Marion and State of Indiana, have invented certain new and useful Improvements in Vehicle Shaft or Pole Couplings, of which the following is a specification.

The object of my invention is to produce a cheap yet efficient coupling by means of which vehicle shafts or poles may be easily and quickly connected to or disconnected from the front axle of a vehicle, the construction being such that, if necessity demands, the shafts or pole may be quickly detached in case of a runaway team, so that the vehicle may be cut free from the team.

The accompanying drawings illustrate my invention.

Figure 1 is a perspective view of my device with the connecting latch-hood raised to detaching position. Fig. 2 is a perspective view of the axle-piece. Fig. 3 is a perspective view of the shaft or pole piece. Fig. 4 is a side elevation of my device with the parts in connected positions, and Fig. 5 is a longitudinal section.

The axle-piece consists of a usual U-shaped clip 6, which is adapted to straddle the axle in the usual well-known manner and is provided with screw extensions 7, upon which is placed the usual cross-bar 8. Extending from the front arm of clip 6 is a pin or lug 9, which is preferably hollow, as shown in Fig. 5, for the sake of lightness and also for the sake of protecting a desirable spring. Pivoted at 10 to the forward arm of clip 6 is a latch, which is preferably in the form of a hood 11, which straddles pin 9 and which is provided at each side with a recess 12, open at its bottom. Hood 11 is provided at its upper side with a lug 13, to which may be attached one end of a bar 14, which bar will extend to the hood of another coupling, two of the axle-pieces being generally required for each vehicle. The thill-piece consists of a thimble 15, having formed therein a socket 16, adapted to receive pin 9. Thimble 15 is provided at its forward end with a pair of ears 17, between which extends a pin 18, upon which may be pivoted one of the usual eyepieces carried by the shafts or pole. Thimble 15 carries at each side a lug 18, which is adapted to be received in the corresponding socket 12 of the hood 11.

In operation two of the axle-pieces are secured in the usual manner to the axle, the pins 9 thereof projecting forward and the lugs 13 of the two hoods 11 being preferably connected by a bar 14. Each pair of shafts and each pole belonging to this vehicle will then be provided with a pair of the thill-pieces shown in Fig. 3, the thimble 15 thereof projecting to the rear. Any number of shafts or poles may then be successively attached to the pair of axle-pieces by slipping the thimble 15 over the corresponding pin 9, raising the hood 11 thereof, so as to allow the bar to be brought back as far as possible, and the hood then dropped so that its sockets 12 receive lugs 18, and thus lock the two parts securely together. The shafts or pole may be readily detached by merely lifting the hoods 11 and pulling the shafts or pole forward. Hood 11 is preferably pivoted to clip 6 or pin 9 by a shaft 19, which extends through the hollow pin 9. A spring 20 may then be connected to the shaft, so as to normally hold the hood in engagement with the lugs 18.

I claim as my invention—

1. In a shaft or pole coupling, an axle-piece, consisting of means by which it may be secured to an axle, a pin projecting forwardly therefrom, and a hood straddling the pin; and a thill-piece, consisting of a thimble adapted to receive the pin of the axle-piece, means carried by said thimble for engagement by the hood of the axle-piece, and means to which a shaft or pole may be connected.

2. A shaft or pole coupling consisting of a pin member and a socket member separable in the line of traction, a latch carried by one and adapted to engage the other so as to normally prevent separation of the two members, means carried by one member for attachment to a vehicle-axle, and means carried by the other member for attachment to the vehicle shaft or pole.

3. In a shaft or pole coupling, an axle-piece, consisting of a clip by which it may be secured to an axle, a pin projecting forwardly therefrom, and a hood straddling the pin and provided with a pair of sockets forming extensions of its interior; and a thill-piece, consisting of a thimble adapted to receive the pin of the axle-piece, a pair of lugs carried by the thimble to be received within the sockets of the hood, and a pair of lips between which a pole or shaft eye may be pivoted.

In witness whereof I have hereunto set my hand and seal, at Indianapolis, Indiana, this 22d day of May, A. D. 1902.

JOSEPH HEARNE. [L. S.]

Witnesses:
ARTHUR M. HOOD,
JAMES A. WALSH.